Figure 1:
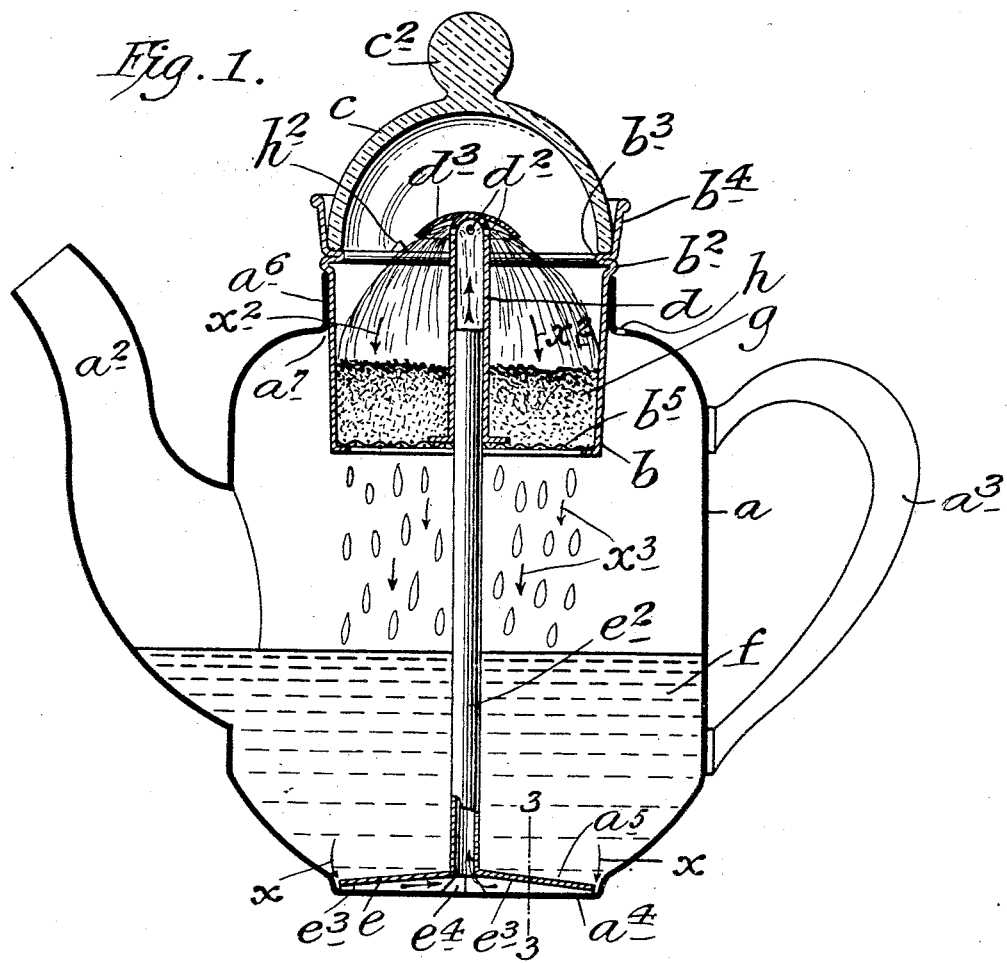

H. E. BIGGINS.
COFFEE POT.
APPLICATION FILED JULY 31, 1908.

961,096.

Patented June 14, 1910.

WITNESSES

INVENTOR.
Henry E. Biggins.
BY Edgar Tate & Co.
ATTORNEYS.

UNITED STATES PATENT OFFICE.

HENRY E. BIGGINS, OF WALLINGFORD, CONNECTICUT.

COFFEE-POT.

961,096.  Specification of Letters Patent.  Patented June 14, 1910.

Application filed July 31, 1908. Serial No. 446,257.

*To all whom it may concern:*

Be it known that I, HENRY E. BIGGINS, a citizen of the United States, and residing at Wallingford, in the county of New Haven and State of Connecticut, have invented certain new and useful Improvements in Coffee-Pots, of which the following is a specification, such as will enable those skilled in the art to which it appertains to make and use the same.

This invention relates to coffee pots and particularly to devices of this class known as percolators; and the object of the invention is to provide an improved device of this class which is simple in construction and operation, and which may be easily and thoroughly cleaned whenever desired, and in which a minimum amount of heat will serve to operate the device; and with these and other objects in view the invention consists in a device of the class specified constructed as hereinafter described and claimed.

The invention is fully disclosed in the following specification, of which the accompanying drawing forms a part, in which the separate parts of my improvement are designated by suitable reference characters in each of the views, and in which—

Figure 2:
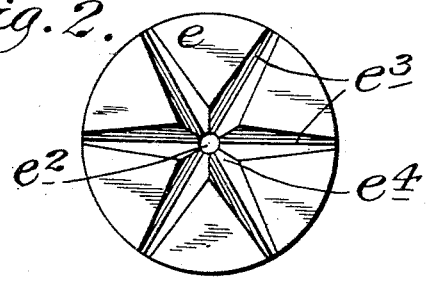
Figure 3:
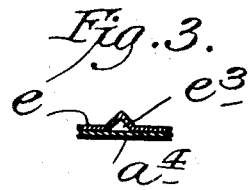

Figure 1 is a central vertical section of a coffee pot made according to my invention; Fig. 2 a bottom plan view of a detail of the construction shown in Fig. 1; and, Fig. 3 a partial section on the line 3—3 of Fig. 1.

In the practice of my invention, I provide a receptacle $a$ composed of sheet metal or any suitable material and provided at one side with a discharge spout $a^2$, and at the opposite side with a handle $a^3$, and the bottom of which is provided with a circular depression $a^4$ forming a corresponding circular depression or chamber $a^5$ in the bottom of the receptacle. The receptacle $a$ is also provided with a neck $a^6$ forming a large central opening $a^7$, and I also provide a receiver $b$ adapted to be inserted into the neck $a^6$ and to fit the opening $a^7$, and which is provided at or near the top thereof, in the form of construction shown, with an annular bead $b^2$ which rests on the neck $a^6$, and the corresponding inwardly directed annular bead $b^3$ above which is a flange or rim $b^4$, and the receiver $b$ is closed by a cap $c$ of glass or any other suitable material, the base of which is adapted to fit within the flange or rim $b^4$ and rests on the inwardly directed annular bead $b^3$, and the cap $c$ is provided at the top thereof with a knob or handle $c^2$. The bottom $b^5$ of the receiver $b$ is composed of fine wire mesh, finely perforated sheet metal, or any other suitable openwork material, and placed within the receiver $b$ centrally thereof and secured to the bottom $b^5$ is a tube $d$, the top portion of which is provided with laterally directed ports or passages $d^2$ and the top of the tube $d$ is also preferably provided with a deflector $d^3$. I also provide a disk $e$ which is adapted to approximately fit within the depression or chamber $a^5$ in the bottom of the receptacle $a$, and said disk is provided centrally with a tube $e^2$ which is of such length as to pass up into the tube $d$ in the receiver $b$ when said receiver is placed in position as shown in Fig. 1, and the tube $e^2$ is also preferably shorter than the combined height of the receptacle $a$ and the neck $a^6$ thereof, so that when the disk $e$ with the tube $e^2$ is placed in the receptacle $a$, the receiver $b$ may be inserted into the neck $a^6$ of the receptacle $a$, and said neck will guide said receiver and the tube $e^2$ will enter the tube $d$. The disk $e$ is preferably made of sheet metal and the bottom thereof is provided with radial grooves $e^3$, the dimensions of which increase from the perimeter of the disk inwardly and the inner ends of said grooves communicate with the tube $e^2$ as clearly shown in Figs. 1 and 2.

In practice, the tube $e^2$ with the disk $e$ at the bottom thereof is placed in the receptacle $a$ and said receptacle is filled, or partially filled, with water as shown at $f$, and the coffee is placed in the receiver $b$ as shown at $g$, and said receiver is inserted into the neck $a^6$ of the receptacle $a$, and in this operation the tube $e^2$ passes into the tube $d$ in the receiver $b$. The receptacle $a$ is then placed over a suitable heater of any kind or class, and as the water therein is heated, it passes beneath the perimeter of the disk $e$ as indicated by the arrow $x$, through the radial grooves or passages $e^3$ in the bottom of said disk into the tube $e^2$, and up through said tube into the tube $d$ in the receiver $b$, and is forced out through the ports or passages $d^2$ in the top of the tube $d$ and falls on the coffee in the receiver $b$ as indicated by the arrows $x^2$, and this water percolates through the coffee $g$ and falls into the bottom of the receptacle $a$ as indicated by the arrows $x^3$, and this operation or flow of the water continues as long as heat is applied to the bottom of the receptacle $a$. I also preferably provide the top of the receptacle $a$ with a vent opening or openings $h$ and another vent opening $h^2$ is formed in the bottom of the cap $c$, the object of these vent openings being to prevent a too great increase of pressure in the receptacle $a$ and in the receiver $b$.

It will be understood, of course, that the cap $c$ is removable, and said cap may be detachably connected with the receiver $b$ in any desired manner.

My improved coffee pot, or the receptacle $a$, may be placed on or over any suitable heater and it is understood that the heat is applied directly to the bottom $a^4$ of the depression or chamber $a^5$ in the bottom of the receptacle $a$ and in which the disk $e$ is placed, and all that is necessary to start the circulation of water, or the feeding of water through the tube $e^2$ is to heat the water into the radial passages $e^3$ in the bottom of said disk and at the lower end of the tube $e^2$, and this is quickly done. The inner ends of the radial passages $e^2$ are enlarged so as to form a considerable chamber or recess around the lower end of the tube $e^2$ as clearly indicated at $e^4$ in Figs. 1 and 2, and this facilitates the circulation of the water as hereinbefore described.

It will be understood, of course, that the operation of my improved coffee percolator is, in the main, the same as other devices of this class, but by means of my improvement, I provide for a more rapid circulation of water through the tube $e^2$ and a consequent freer discharge of water onto the coffee in the receiver $b$, and the brewing of the coffee is effected more quickly and in a more thorough manner than is possible with other devices of this class as usually constructed.

Having fully described my invention, what I claim as new and desire to secure by Letters Patent, is:—

1. In a coffee pot, a receptacle provided at the top with a neck, a coffee receiver adapted to be inserted into said neck and provided with a removable cap and an openwork bottom and centrally of said bottom with a tube which is secured thereto and which extends upwardly and the top of which is provided with discharge ports or passages, and a feed tube provided at one end with a disk adapted to rest on the bottom of the receptacle, and the other end of which is adapted to enter the tube in the receiver, the bottom of said disk being flat and provided with radially arranged passages which communicate with said tube, the dimension of said passages increasing from the perimeter of said disk inwardly to said tube.

2. A coffee pot, comprising a receptacle, the bottom of which is provided with a circular depression forming therein a corresponding circular depression or chamber, said receptacle being also provided at the top thereof with a neck, and a receiver adapted to be inserted into said neck and provided with an openwork bottom centrally of which is secured an upwardly directed tube having discharge ports or passages at the top thereof, and a tube provided with a disk adapted to rest in the depression or chamber in the bottom of the receptacle, the bottom of said disk being flat and provided with radial passages which communicate with said tube and the dimensions of which increase from the perimeter of said disk inwardly to said tube, and the upper end of said tube being adapted to enter the tube in the receiver when said receiver is inserted into the neck of the receptacle, said receiver being also provided with a removable cap, and the cap and receptacle being provided with vents.

In testimony that I claim the foregoing as my invention I have signed my name in presence of the subscribing witnesses this 28th day of July 1908.

HENRY E. BIGGINS.

Witnesses:
OSWIN H. D. FOWLER,
ALFRED L. PIERCE.